Aug. 19, 1947.  B. S. T. BISHOP ET AL  2,426,139
TOOL CONTROL MECHANISM FOR MACHINE TOOLS
Filed June 8, 1944  3 Sheets-Sheet 1

Inventors.
Benjamin S. T. Bishop
Frank A. Bicknell
John H. McKenna
By their Atty.

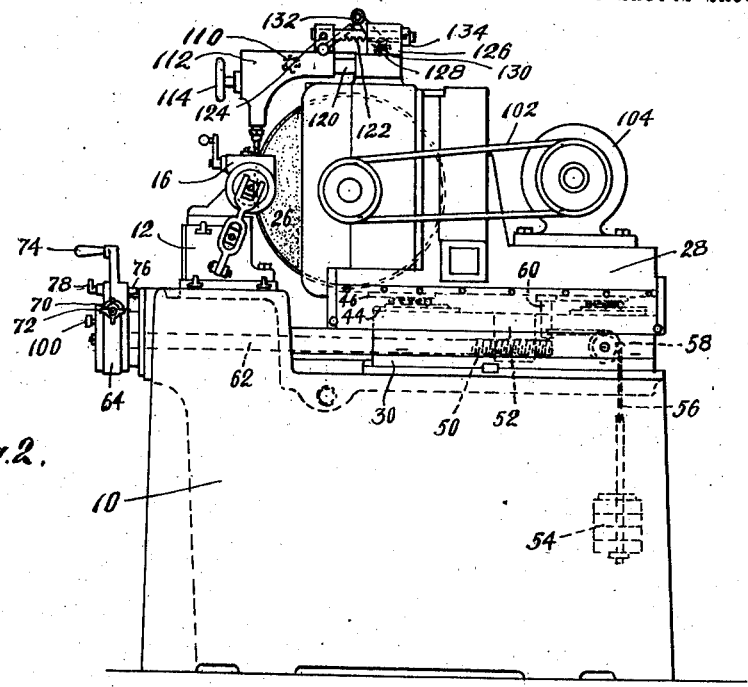
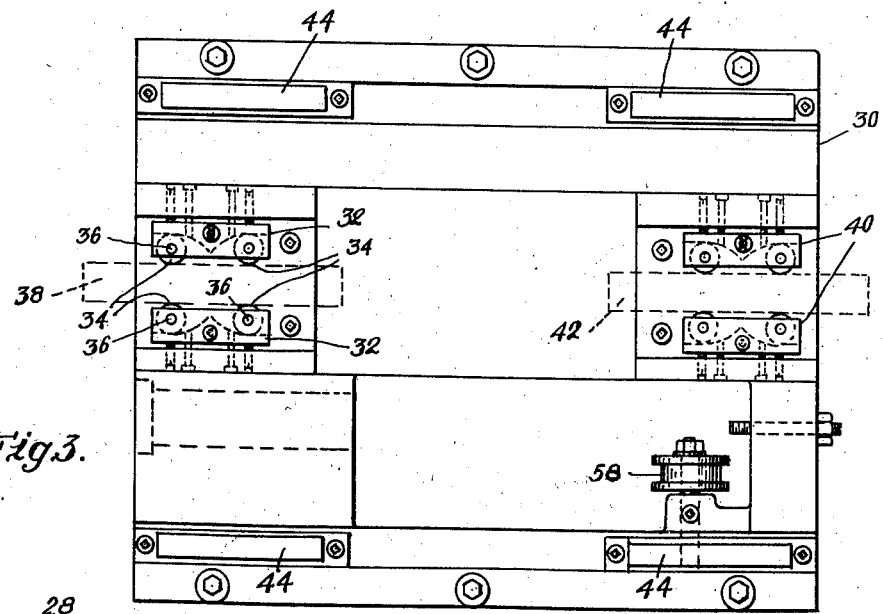
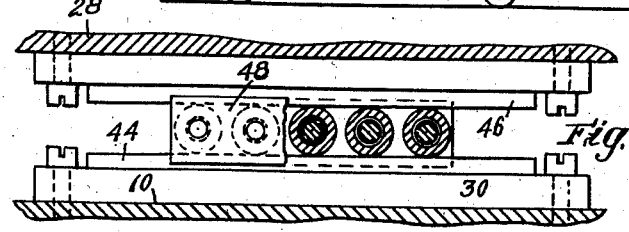

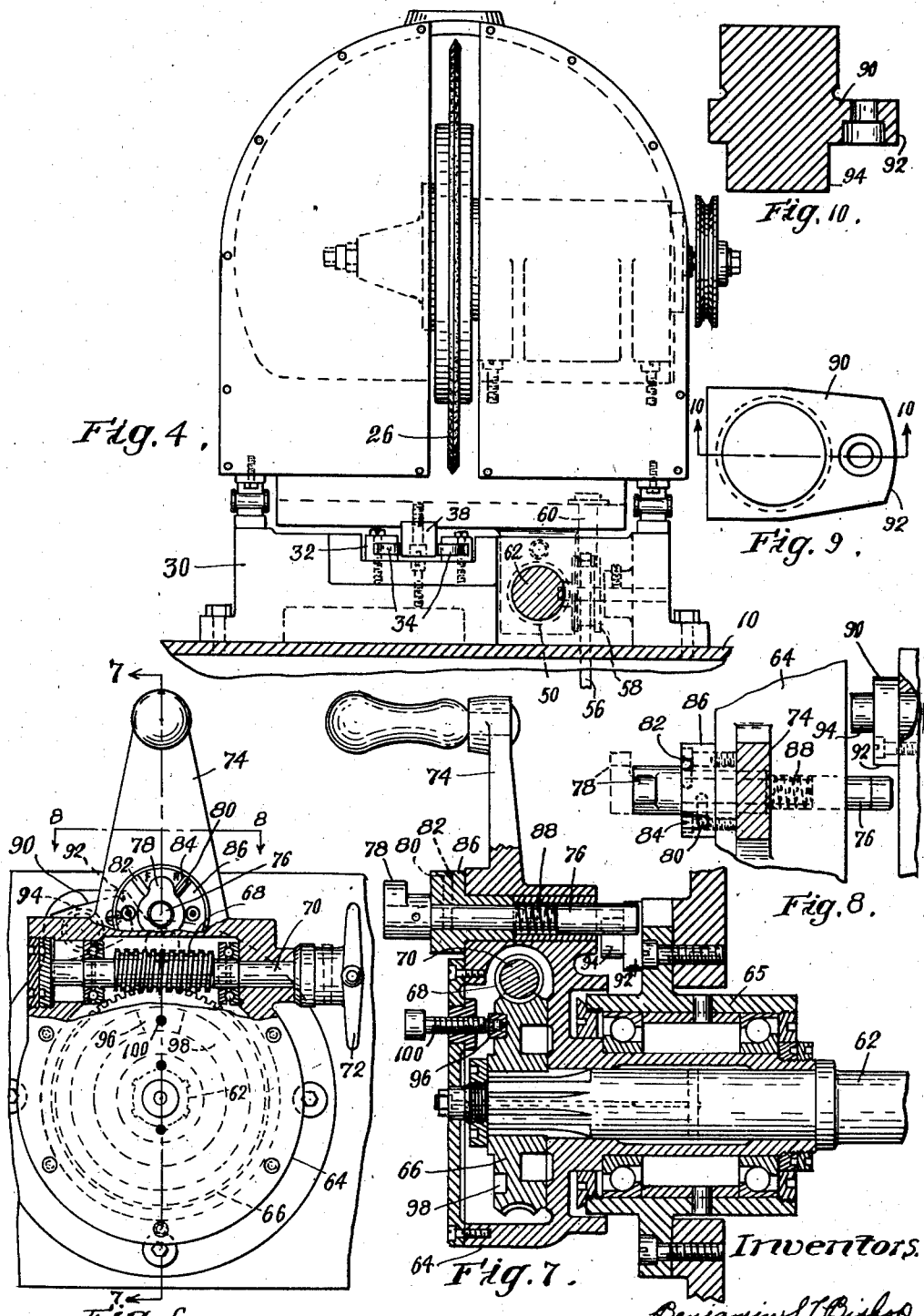

Patented Aug. 19, 1947

2,426,139

UNITED STATES PATENT OFFICE 2,426,139

TOOL CONTROL MECHANISM FOR MACHINE TOOLS

Benjamin S. T. Bishop, Shrewsbury, and Frank A. Bicknell, Worcester, Mass., assignors to Leland-Gifford Company, Worcester, Mass., a corporation of Massachusetts Application June 8, 1944, Serial No. 539,357

4 Claims. (Cl. 51—165)

This invention relates to improvements in machine tools of the general class in which the work is held between centers of headstock and tailstock spindles and is moved axially past the tool which is to perform a particular operation on the work. Either or both the work and the tool may rotate depending upon the requirements of the operation to be performed. Our present invention more particularly concerns improved means for setting and controlling the tool with relation to the work and, while we illustrate and describe our invention in connection with a thread grinding machine, it will be apparent that our novel features are not limited to thread grinders or to rotating tools but have utility and importance in connection with the control and setting of tools generally which operate at a relatively fixed location past which the work moves in operative relation to the tool.

It is an object of our invention to provide means for mounting a tool for manual movement thereof toward and away from the axis of work-supporting centers, including provision for manual relatively fast substantial movement of the tool both rearward and forward, and for an initial manual relatively microscopic forward advance of the tool as it approaches the work, for precision setting of the tool, after which the precision setting is preserved during subsequent rearward and forward movements of the tool. We mount the tool on a carriage with a screw feed for moving it toward and from the work, and provide means on the screw shaft for manual fine adjustment of the screw for precision setting of the tool in operative relation to the work, said means being bodily movable with the screw shaft for effecting fast substantial movements of the tool carriage. After an initial precision setting of the tool, subsequent backward and forward movements of the carriage for removal and insertion of work pieces do not disturb the initially attained precision adjustment, and the carriage each time can be quickly moved forward until stop means arrests its travel with the tool in the initially adjusted precision setting with relation to the work, so that each of a multiplicity of similar work pieces may be acted upon by the tool in precisely the same manner.

Another object of our invention is to provide stop means for the forward movement of the tool carriage including a stop for arresting the forward travel with the tool in proper relation to the work for making a rough cut as the work is moved past the tool, and including also a stop for arresting the forward travel of the carriage with the tool in position for making a finish cut as the work moves past it, with means for manual selection as between the stops.

As embodied in a thread grinding machine, our invention has the further object of mounting a grinding wheel and its driving motor on the carriage which moves toward and from the work holding centers, with means constantly biasing the carriage rearward so that the same faces of the feed screw threads always are the working faces.

Still another object resides in the provision of braking means for restraining too free rotation of the feed screw whereby accuracy of initial precision settings of the tool is promoted and accidental disturbance of such settings is minimized.

It is, moreover, our purpose and object generally to improve the structure and operation of machine tools of the general class specified.

In the accompanying drawings:

Figure 2 is an end elevation of the machine of Figure 1, looking from the right;

Figure 3 is a plan view of the tool-carriage-supporting base;

Figure 4 is a front elevation of the tool carriage and its supporting base, the feed screw and a portion of the machine bed being shown in cross section;

Figure 5 is a fragmentary sectional view showing one of the roller bearing units between the tool-carriage and its base;

Figure 6 is a front elevation of the feed screw operating means at the front of the machine, a portion of its casing being broken away to show the precision adjusting means in cross-section;

Figure 7 is a vertical section on line 7—7 of Figure 6;

Figure 8 is a fragmentary plan view in section through the handle on line 8—8 of Figure 6;

Figure 9 is a front elevation of the stop member;

Figure 10 is a cross-sectional view on line 10—10 of Figure 9; and

Figure 1:
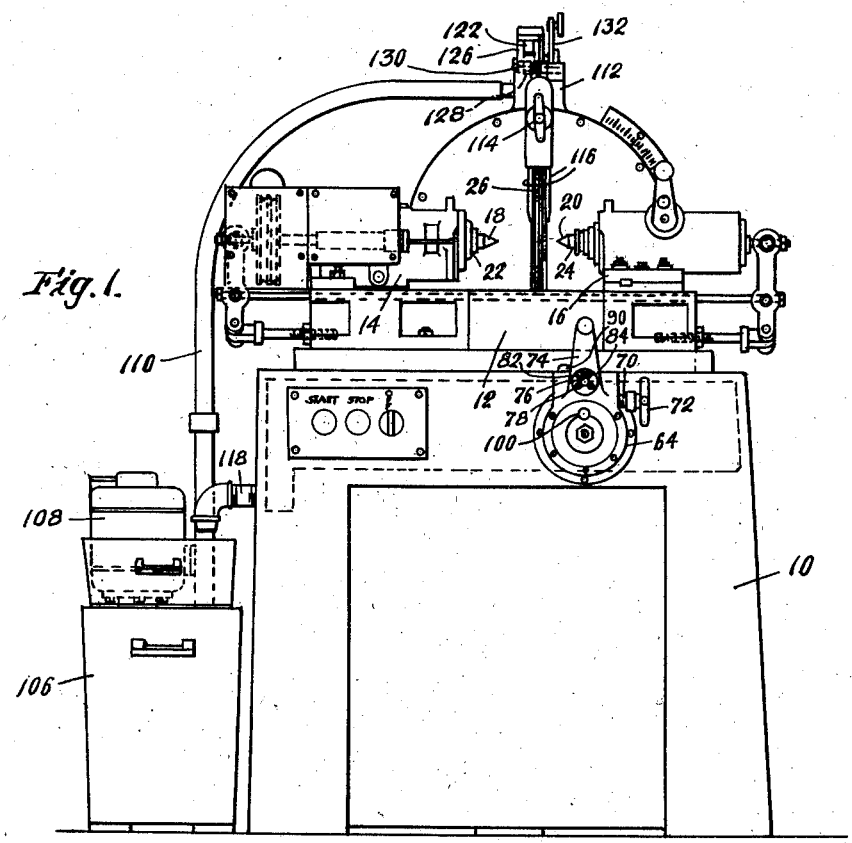
Figure 1 is a front elevation of a thread grinding machine embodying features of our invention.

Referring to the drawings, the bed 10 of the thread grinding machine herein illustrated has mounted forwardly and at its upper part the base 12 on which the headstock 14 and tailstock 16 are adjustably mounted in spaced apart relation. A piece of work to be threaded may be mounted between the centers 18, 20 respectively in the headstock spindle 22 and the tailstock spindle 24, the centers being movable in unison in axial directions past the grinding wheel 26 while the work is rotated at a suitably slow speed as by frictional engagement with the center of the headstock spindle which may be rotated in any suitable manner while being moved axially for feeding the work in thread-grinding relation to the wheel 26.

The grinding wheel 26 is mounted on a wheel carriage 28 which is movable in a horizontal plane in directions toward and away from the axis of the work-holding centers 18, 20. As represented in Fig. 2, the bed 10 has a rear top horizontal portion somewhat lower than the forward top part on which the headstock and tailstock supporting base 12 is mounted, and this lower portion of the bed has a base 30 secured thereon for supporting the wheel carriage 28. Base 30, at its forward end, has a pair of roller bearing units 32 adjustably spaced apart as best seen in Fig. 3, the rollers 34 having vertical axes 36 so that the rollers can engage opposite side surfaces of a guide rail 38 on the under side of the wheel carriage 28. There is a similar pair of roller bearing units 40 at the rear end of base 30, coacting with a guide rail 42.

Referring more particularly to Figs. 3, 4 and 5, it will be seen that the base 30 has the parallel horizontal tracks 44, extending respectively along each side edge of the base, and the wheel carriage 28 has similar tracks 46 on its under side, so that the carriage can move along the base tracks 44 with the roller bearing units 48 intervening between the base tracks 44 and the carriage tracks 46, to facilitate free movement of the carriage.

Movement of the carriage, forward or rearward, on the base tracks 44 is effected by a feed screw 50 which is threadedly engaged with a nut 52 fixed on the under side of the carriage, and a weight 54 tends always to move the carriage rearward for maintaining the same face of the screw threads in coacting relation with the nut, thereby eliminating the effect of any play there may be between the threads of the feed screw 50 and nut 52. The weight 54 is shown suspended from one end of a cable or chain 56 trained over a pulley 58, with its other end secured to a stud or pin 60 depending from the under surface of the carriage.

The feed screw 50 has a long shaft 62 extending forwardly into a casing 64 which is mounted rotatably on the forward end of the shaft 62, with a ball bearing support 65 for the casing 64 in the front wall of bed 10. A worm gear 66 is keyed to the forward end of shaft 62 within the casing 64, and meshes with a worm 68 mounted within the casing 64 above the worm gear 66 and transversely of the axis of shaft 62. The worm 68 is rigid on a shaft 70, one end of which extends out through the casing side wall with a knob 72 on its outer end for manual rotation of the worm when effecting precision adjustment of the wheel carriage and more especially the grinding wheel 26 mounted thereon. However, a substantial movement of the wheel carriage, such as a rearward movement thereof preparatory to insertion or removal of a work piece, may be effected quickly by a mere partial rotation of casing 64 by means of the handle 74, and it is a feature of our present invention that such substantial movements of the wheel carriage may be accomplished without disturbing a previously attained precision adjustment of the grinding wheel. Also such a previously attained precision adjustment of the wheel may be preserved while a rough cut is made in the work, to be followed by a finish cut with the wheel in the said precision-adjusted position. These results are made possible and practicably feasible, by a stop pin 76 extending through the upper part of casing 64, in parallelism with the feed screw shaft 62. Pin 76 has a knob 78 on its forward end and has a radially disposed pin 80 for engaging in one or the other of two radial grooves 82, 84 in the front face of a bushing 86 which constitutes a bearing for the stop pin 76. The groove 82 is shallower than groove 84 so that stop pin 76 projects further rearward when radial pin 80 is in groove 84 than when it is in groove 82. A spring 88 constantly biases the stop pin rearwardly, thereby to seat radial pin 80 on the bottom of whichever groove 82 or 84 it is in. Adjacent the inner end of stop pin 76, there is fixedly mounted a stop member 90 having an abutment 92 located to be in the path of movement of the inner end of the stop pin 76 when the latter is in its rearmost position, and casing 64 is rotated counter-clockwise. When stop pin 76 is in its forward position, as when radial pin 80 is seated in radial groove 82, its inner end clears the abutment 92 when casing 64 is rotated, but a second abutment 94 on stop member 90 is located to be in the path of stop pin 76. Hence, when the radial pin 80 is seated in the right hand radial groove 84 (Fig. 6), the handle 74 may be moved counter-clockwise to rotate casing 64 until stop pin 76 engages the abutment 92. When radial pin 80 is seated in the left hand radial groove 82 (Fig. 6), the handle 74 may be moved further counter-clockwise until stop pin 76 engages abutment 94.

Preferably a braking shoe 96 restrains rotation of the worm gear 66, it being shown riding in a groove 98 in the forward face of the gear with a screw 100 at the front of casing 64 for adjusting the pressure of the shoe on the gear.

In operation, assuming that a number of identical work pieces, such as valve tappets, are to be threaded, the grinding wheel may be moved rearward a desired distance by moving handle 74 in clockwise direction. Knob 78 will be pulled out and rotated to seat radial pin 80 in the right hand or rough cut radial groove 84. After a work piece has been inserted between the centers 18, 20, the wheel will be moved forward, by counter-clockwise movements of handle 74 until the stop pin 76 engages abutment 92, after which, assuming the wheel to be rotating as by the belt connection 102 to motor 104, it will be fed into the work by manual rotation of knob 72, to a position for making a desired rough cut as the work is rotated and moved axially past the grinding wheel. This rough cut may be made, for example, as the work moves axially from right to left in Fig. 1. Then, while the work stands stationary at the limit of its travel to the left, knob 78 may be pulled out and rotated to seat radial pin 80 in the left hand or finish cut radial groove 82, after which a slight manual counter-clockwise movement of handle 74 to bring stop pin 76 against abutment 94, sets the wheel forward the desired amount for making the finish cut as the rotating work moves from left to right past the grinding wheel.

When the work comes to rest at the limit of its axial movement to the right, the wheel again will be backed away by clockwise movement of handle 74, to permit removal of the threaded work piece and insertion of another between the centers 18, 20. However, the grinding wheel is now properly adjusted for both the rough and finish cutting of this second work piece and all subsequent similar work pieces. The operator needs only to seat radial pin 80 in the radial groove 84 and move handle 74 counter-clockwise until stop pin 76 engages abutment 92, and the wheel is set for a rough cut precisely the same as that taken in the first work piece. After the rough cut is made in this second work piece, the operator merely seats radial pin 80 in the radial groove 82 and moves handle 74 counter-clockwise until stop pin 76 engages abutment 94 and the grinding wheel is set for a finish cut precisely like the finish cut taken on the first work piece.

It will be obvious from the foregoing description, in connection with the drawings, that we have provided in a machine tool, a tool control and adjustment which greatly facilitates mass production of work pieces, the machine operations upon which can have predetermined precision accuracy with no special skill required of the operator of the machine. Notwithstanding that our invention is illustrated and described in connection with a thread grinding machine in which a grinding wheel is the tool whose movements and settings are controlled, it should be understood that our invention is applicable to machine tools generally where a tool is to be set for a rough cutting operation to be followed by a precision-adjusted finish cutting operation, or where a tool is to be set initially for accomplishing a finish cut.

The particular machine herein illustrated and described, being a thread grinding machine, requires a coolant at the region of cutting to prevent overheating of the work and the tool. A suitable coolant distributing system is shown in Fig. 1, including a tank 106 on which is mounted an electric motor 108 which drives a suitable pump (not shown) within the tank. The coolant is forced through conduit 110 to the valve housing 112 above the grinding wheel 26, the hand valve 114 controlling the flow from housing 112 to the rigid pipes 116 extending down to the grinding region with their lower ends disposed to direct the coolant at the place of grinding contact of the wheel with the work. The forward top portion of the bed 10 is hollow, and suitable openings are provided for drainage of used coolant into its hollow whence it can flow through drain pipe 118 back into tank 106 or, preferably into a pan from which, after filtering, it may go back into tank 106.

The valve housing 112 preferably is slidably mounted on its supporting rod 120 for movements between an operative position as represented in Fig. 2, and a rearward position in which the pipes 116 will be moved rearward away from the cutting edge of the wheel, such as when the wheel is to be trued. This movement of the valve housing 112 may be accomplished by a rack 122 having its forward end secured as at 124 to the valve housing, and extending rearward into a casing 126 within which is a gear 128 meshing with the rack teeth. The gear 128 is on a shaft 130 which extends out through one side of casing 126 with a handle 132 on its outer end for rotating the gear and thus moving the rack either forward or rearward. The rack extends out through the rear wall of casing 126 and has a stop collar 134 adjustable thereon for limiting the forward travel of the rack. Hence, by setting collar 134 against casing 126 when the pipes 116 are in correct operating position, the collar henceforth will stop the valve housing with pipes 116 in that proper position whenever the housing is moved forward from a temporary rearward position.

Figure 11:
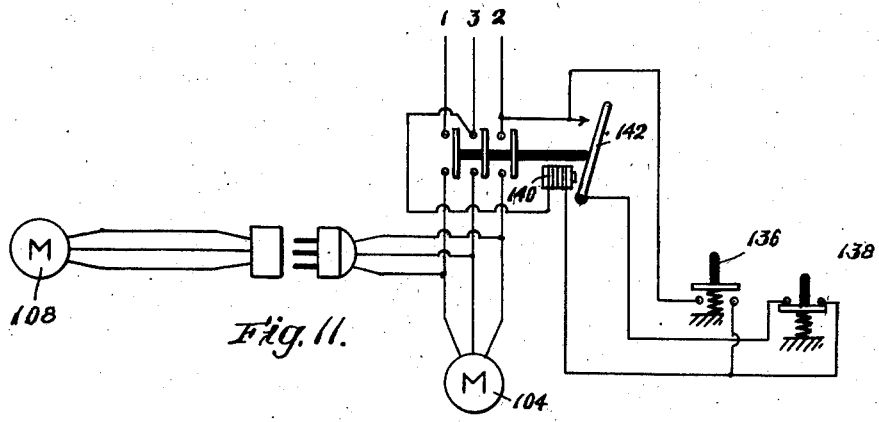
Figure 11 is a diagram of the electrical circuit.

In the wiring diagram of Fig. 11, the motor 104 for driving the grinding wheel 26 is a three phase motor whose operation is controlled by the start and stop switches 136, 138. Switch 136 is normally open and switch 138 is normally closed, and each is spring urged to its normal position. When switch 136 is pressed inward a circuit is closed through the solenoid 140 which attracts switch arm 142 to close the motor circuit. Also switch arm 142, when in attracted position, closes a circuit through the normally closed stop switch 138, so that solenoid 140 continues energized after start switch 136 is released and springs to its normally open position. Hence the motor circuit continues closed so long as stop switch 138 remains closed. When it is desired to stop motor 104, a momentary inward pressure on stop switch 138 de-energizes solenoid 140 permitting switch arm 142 to return to its non-attracted position of Fig. 11. The motor circuit simultaneously opens, and cannot be closed again until start switch 136 is again pressed inward, notwithstanding that stop switch 138 springs back to normally closed position when released.

The coolant system motor 108 may be plugged into the circuit of motor 104 at will.

We claim as our invention:

1. In a machine tool having a movable carriage, means for moving and adjusting the position of the carriage comprising a feed screw rotatably fixed relative to the carriage and threadedly engaged therewith, a casing rotatably fixed relative to the carriage and rotatably supporting one end of said screw, mechanism mounted in said casing for manual rotation of the screw independent of rotation of the casing, said mechanism locking the screw and casing for rotation as a unit when the casing is rotated, a stop member fixed adjacent to said casing, and a coacting stop member carried by said casing for limiting angular motion of the latter in one direction; said fixed stop having a plurality of abutments thereon simultaneously disposed in positions for coaction with said coacting stop member, and said coacting stop member carried by said casing being adjustable to either of a plurality of stop positions for engaging one or another of said abutments of the fixed stop member, thereby to stop movement of the carriage in one or another position, when said casing is rotated in one direction.

2. In a machine tool having means for holding and moving work past a tool, that improvement comprising a tool carriage movable toward and from the axis of travel of the work, a feed screw rotatably fixed relative to the carriage and threadedly engaged therewith, said screw having a shank extending to the front of the machine, a casing rotatably fixed at the front of the machine and rotatably mounting the shank of the screw, mechanism in said casing manually movable for rotating said shank relative to the casing thereby to effect precision adjustments of the carriage relative to the work, said mechanism locking said shank and casing for rotation as a unit when the casing is manually rotated, a fixed stop member adjacent to said casing, and a coacting stop member carried by the casing for limiting rotation of the casing, said fixed stop member having a plurality of abutments thereon simultaneously disposed in positions for coaction with said coacting stop member, and said coacting stop member carried by said casing being adjustable to either of a plurality of stop positions for engaging one or another of said abutments on the fixed stop member when said casing is rotated in one direction.

3. In a machine tool having a movable carriage, means for moving and adjusting the position of the carriage comprising a feed screw rotatably fixed relative to the carriage and threadedly engaged therewith, a casing rotatably fixed relative to the carriage and rotatably supporting one end of said screw, mechanism mounted in said casing for rotation of the screw independent of rotation of the casing, said mechanism locking the screw and casing for rotation as a unit when the casing is rotated, a stop member fixed adjacent to said casing having a plurality of abutments standing at different distances rearward from said casing and at different locations around the axis of the casing, and a stop pin slidably mounted in said casing extending from front to rear thereof and biased in direction rearward, means disposed radially of the axis of said pin for selectively limiting the rearward extent of the pin for engagement with one or the other of said abutments when said casing is rotated.

4. In a machine tool having a movable carriage, means for moving and adjusting the position of the carriage comprising a feed screw rotatably mounted relative to the carriage and threadedly engaged therewith, a casing rotatably fixed relative to the carriage and rotatably supporting one end of said screw, mechanism mounted in said casing for rotation of the screw independent of rotation of the casing, said mechanism locking the screw and casing for rotation as a unit when the casing is rotated, a stop member located adjacent to said casing having a plurality of abutments standing at different distances rearward from said casing and at different locations around the axis of the casing, and a stop pin slidably mounted in said casing extending from front to rear thereof, and biased in direction rearward, a radially disposed lug projecting from said pin forwardly of said casing, and a pair of radially disposed grooves in the front wall of said casing and having different depths, in either of which grooves said radially disposed lug may be selectively engaged, to position the inner end of the pin for engagement with one or the other of said abutments when said casing is rotated.

BENJAMIN S. T. BISHOP.
FRANK A. BICKNELL.

REFERENCES CITED

The following references are of record in the file of this patent:

UNITED STATES PATENTS

| Number | Name | Date |
| --- | --- | --- |
| Re. 16,196 | Bath | Nov. 3, 1925 |
| 1,141,205 | Norton | June 1, 1915 |
| 1,872,191 | Smith | Aug. 16, 1932 |
| 1,687,398 | Silven | Oct. 9, 1928 |
| 1,270,808 | Franklin | July 2, 1918 |
| 2,142,028 | Herfurth | Dec. 27, 1938 |

FOREIGN PATENTS

| Number | Country | Date |
| --- | --- | --- |
| 431,741 | Great Britain | July 15, 1935 |